United States Patent
Kagawa et al.

(10) Patent No.: US 6,265,034 B1
(45) Date of Patent: Jul. 24, 2001

(54) LIQUID CRYSTAL DISPLAY DEVICE

(75) Inventors: Hiroyuki Kagawa, Hitachi; Katsumi Kondo, Mito; Toshiki Asakura; Makiko Kida, both of Mobara; Yasushi Iwakabe, Chiba, all of (JP)

(73) Assignee: Hitachi, LTD, Tokyo (JP)

( * ) Notice: Subject to any disclaimer, the term of this patent is extended or adjusted under 35 U.S.C. 154(b) by 0 days.

(21) Appl. No.: 09/309,570

(22) Filed: May 11, 1999

(30) Foreign Application Priority Data

May 29, 1998 (JP) .................................................. 10-148687

(51) Int. Cl.$^7$ .......................... C09K 19/38; C09K 19/52; G02F 1/1333
(52) U.S. Cl. ................... 428/1.1; 252/299.01; 252/299.5
(58) Field of Search ............................ 252/299.01, 299.4, 252/299.5; 428/1.1

(56) References Cited

FOREIGN PATENT DOCUMENTS 8-176549 * 7/1996 (JP) .

OTHER PUBLICATIONS

The Transaction of 16th Liquid Crystal Conference, pp. 326–327 (1990).
"Organic Photochemistry", published by Kagaku Dojin 1970), p. 220.
"Physical Properties of Liquid Crystal", W. H. de Jeu: Translated by Chikara Ishii et al, p. 42, Kyoritsu Publishing Co., (1991).
Journal of the American Chemical Society, W. G. Shaw et al, vol. 81, pp. 2532–2537 (1959).
Journal of American Chemical Society, H. E. Zimmerman et al, vol. 82, pp. 5865–5873(1960).

* cited by examiner

*Primary Examiner*—Shean C. Wu
(74) *Attorney, Agent, or Firm*—Antonelli, Terry, Stout & Kraus, LLP

(57) ABSTRACT

Decreasing the non-uniformity of display by photo-deterioration of the liquid crystal material is achieved in order to provide high grade liquid crystal display devices. A pair of substrates holding a liquid crystal layer between them are adhered together with a resin, and at least an opening for injecting liquid crystal into the interval between the pair of substrates is provided in the resin portion. The opening is sealed with a photo-curable resin. The liquid crystal layer contains a photo-reactive liquid crystal compound, the molecular structure of which is converted by a photo-irradiation, and an photo-absorbing organic compound having a photo-absorptivity larger than that of the photo-reactive liquid crystal compound at a designated wavelength, and containing at least one of alkyl substituent, alkenyl substituent, and alkoxyl substituent of 1–8 carbon atoms, respectively, in its molecule.

15 Claims, 8 Drawing Sheets

LIQUID CRYSTAL DISPLAY DEVICE

BACKGROUND OF THE INVENTION

The present invention relates to a liquid crystal display device in which non-uniformity of display, which is caused by photo-deterioration of the liquid crystal material, is eliminated.

The liquid crystal display device is manufactured by the steps of arranging a pair of substrates, which are provided with electrodes and an alignment layer (orientation film), at a desired position, injecting a liquid crystal layer between the pair of substrates, and sealing an inlet for injecting the liquid crystal with an UV curable resin. The UV curable resin can be used as an adhesive agent for joining the substrates in some cases. Furthermore, in typical cases, the incident light into the liquid crystal display element, such as solar light, contains an ultraviolet component. As described above, the liquid crystal display element is exposed to various light during the manufacturing process and in the environment in which it is used.

The liquid crystal material is an organic compound unstable against light, particularly ultraviolet rays, which causes various reactions such as isomerization, decomposition, polymerization, and other problems. The liquid crystal materials which are particularly reactive with ultraviolet rays are, for instance, trans-$\alpha$, $\beta$-difluoro-$\beta$-phenylstyrene derivatives (The transaction of 16th Liquid Crystal Conference, 326–327 (1990)). Such materials are effective for decreasing the viscosity of the liquid crystal material and increasing the response velocity of the liquid crystal display element. Furthermore, tolane derivatives, having a structure wherein two or more benzene rings are combined by carbon-carbon triple bonds, are also liquid crystal materials which are deteriorated by ultraviolet rays.

As a means for decreasing the influence of incident light entering into the liquid crystal element from affecting the liquid crystal material, a method of adding a light stabilizer into the liquid crystal material (JP-A-62112131 (1987))— the photo-stabilizers are well known as ultraviolet absorbers (Teruo Matsuura: "Organic photochemistry", page 220, published by Kagaku Dojin (1970)), such as o-oxybenzophenone group compounds, salicylic acid phenylester group compounds, benzotriazole group compounds, cyanoacrylate derivatives, and the like; and a method of using an ultraviolet absorber having a range of specified photo-absorption wavelengths (ultraviolet absorber as same as the previously described photo-stabilizer and azulene) (JP-A-8-176549 (1996)) have been disclosed.

The ultraviolet absorbers, their absorbing wavelength, and their additive amount have been disclosed. However, a relationship between the absorbing wavelength and the absorptivity of the photo-absorbers with their concentration, which is indispensable for decreasing the deterioration by light, has not been taught.

The inventors had a problem in that a non-uniformity of display was generated in the vicinity of the inlet for injecting the liquid crystal of the liquid crystal display apparatus, which liquid crystal mixture was comprised of trans-$\alpha$, $\beta$-difluoro-$\beta$-phenylstyrene derivatives. Furthermore, at the display portion, a non-uniformity of display was generated by photo-irradiation when no polarizer was provided. By a study of the details, it was found that the birefringence ($\Delta n$) of the liquid crystal, at the portion where the non-uniformity of display was generated, was significantly lower in comparison with that of the liquid crystal at a normal portion. It was found that the decrease in the birefringence $\Delta n$ was based on a photo-isomerization reaction of the trans-$\alpha$, $\beta$-difluoro-$\beta$-phenylstyrene derivatives in the liquid crystal mixture to a cis-isomer caused by irradiation of ultraviolet rays during the manufacturing step of sealing the inlet for the liquid crystal with an UV curable resin.

Even if a liquid crystal having an insufficient photostability is used, the influence of an external light, such as sun light and other light, will scarcely cause any problem in a normal condition of use, because a polarizer is provided on the liquid crystal display element and the polarizer has an effect to shield the ultraviolet rays.

As a means for decreasing the reaction of the liquid crystal with ultraviolet rays at the step of sealing the inlet for the liquid crystal, methods of adding a photo-absorber, such as benzophenone derivatives, benzotriazole derivatives, cyanoacrylate derivatives, azulene, and the like, have been disclosed. However, when a photo-absorber is used, the effect is minimal, because solubility of the photo-absorber into the liquid crystal mixture is minimal, and only a small amount of the photo-absorber can be added. Further, the low temperature stability of the liquid crystal mixtures is a problem. That is, the photo-absorber is possibly deposited at a low temperature.

Even if the photo-absorber has a light absorption in the same range of wavelength as the photo-reactive liquid crystal material, the effect is small when its absorptivity is small. Some materials among the photo-absorbers cause a problem in that the specific resistivity of the liquid crystal mixture is significantly decreased thereby.

A method using an ultraviolet ray cut filter when sealing the inlet for the liquid crystal has been disclosed in JP-A-9-160054(1997). However, the method has a problem in that curing of the UV curable resin is performed insufficiently.

SUMMARY OF THE INVENTION

One of the objects of the present invention is to provide a liquid crystal display device having no non-uniformity of display and a high quality of display by suppressing photo-deterioration of the liquid crystal material and a decrease in the birefringence $\Delta n$ caused by the deterioration of the liquid crystal material.

In accordance with the liquid crystal display device of the present invention, a pair of substrates are adhered to each other by a resin, and the resin portion comprises at least an opening for injecting the liquid crystal. The opening is sealed with a photo-curable resin. The liquid crystal layer comprises a photo-reactive liquid crystal compound, which converts its molecular structure with photo-irradiation; and a photo-absorbing organic compound (hereinafter, called a photo-absorption material) comprising at least one of alkyl substituent, alkenyl substituent, and alkoxyl substituent, each of which has carbon atoms in the range of 1–8 atoms in its molecule, and, further, each of the photo-absorbing organic compounds has an photo-absorptivity larger than that of the photo-reactive liquid crystal compound.

In accordance with the present invention, the molecular structure converting reaction caused by photo-irradiation with the photo-reactive liquid crystal compound contained in the liquid crystal layer is mainly a trans-cis isomerization reaction. The compounds which cause the trans-cis isomerization reaction frequently have a double bond, such as a carbon-carbon double bond, carbon-nitrogen double bond, and nitrogen-nitrogen double bond, in their molecules. Representatives ones of the compounds are compounds having a fundamental structure, such as $\beta$-substituted styrene, azobenzene, piperylene, and the like. In particular, the compound having a —CF=CF— type bond in its molecule readily causes a photo-isomerization reaction. Examples of such compounds are compounds having a fundamental structure effective for decreasing the viscosity and increasing the response velocity of the liquid crystal, such as trans-α, β-difluoro-β-phenylstyrene, trans-α, β-difluoro-β-cyclohexyl-styrene, and the like (JP-A-3-294,386 (1991), JP-A-7-165,635 (1995), JP-A-7-126,199 (1995), JP-A-6-329,566 (1994), JP-A-625,030 (1994), JP-A-6-40,967 (1994), JP-A-8-259,478 (1996)).

For instance, practical representatives of the compounds are: R—Ph—CF=CF—Ph—R, R—Ph—CF=CF—Ph—CF3, R—Cy—CF=CF—Ph—R, R—Ph—CF=CF—Ph—F, R—Cy—CF=CF—Ph—X (where, R is an alkyl group or an alkenyl group, Ph is a phenyl group, Cy is a cyclohexyl group, X is a halogen group).

Each of these liquid crystal compounds having a low viscosity is effective for increasing the response velocity of the liquid crystal display element, if its concentration is at least 10% by weight. Other photo-reactive compounds, which are contained in the liquid crystal layer, are compounds having a fundamental structure, such as styrene, tolane, and the like. The photo-reactive compounds are compounds having a diene structure, such as carbonyl compounds, cyclohexadiene, and the like, and olefin compounds causing a dimerization reaction, an additive reaction, and the like. These compounds are effective for increasing the birefringence $\Delta n$, decreasing the viscosity, increasing the dielectric isomerization, and other effects.

In accordance with the present invention, the change rate of birefringence $\Delta n$ of the liquid crystal layer before and after photo-irradiation including a designated specified wavelength, that is, $\Delta n$ (after irradiation)/$\Delta n$ (before irradiation), is equal to or less than 0.94 under a condition where the liquid crystal layer contains a photo-reactive liquid crystal compound and no photo-absorption material.

Furthermore, in accordance with the present invention, the concentration of the photo-absorption material in the liquid crystal layer is at least 1% by weight. A ratio of the concentration of the photo-reactive liquid crystal compound to the concentration of the photo-absorption material in the liquid crystal layer is desirably equal to or less than 10. In case of a mixture composed of plural components, such as the liquid crystal mixture, the photo-absorption by a specified component contained therein with a specified wavelength can be expressed as (the photo-absorptivity of the specified component with the specified wavelength multiplied by its concentration)/(the photo-absorptivity of all the components with the specified wavelength multiplied by the sum of all the concentration). Accordingly, in order to suppress the photo-reactivity, not only the range of absorption wavelength of the component in the liquid crystal mixture, but also the photo-absorptivity and its concentration are important. Due to the presence of the photo-absorption material, the absorbing dose of the photo-reactive liquid crystal compound is decreased, and the photo-reaction becomes difficult to carry out. As a result, the change in birefringence $\Delta n$ is suppressed, and the non-uniformity of display can be decreased.

Furthermore, in accordance with the present invention, the photo-absorption material has at least one of seven carbon-carbon double bonds, seven carbon-nitrogen double bonds, or seven nitrogen-nitrogen double bonds in its molecule. When the molecule has at least seven double bonds bonded as conjugated groups, the photo-absorption effect of the material is significant, because the photo-absorptivity is large, and the range of absorption wavelength is wide. Practical fundamental structure of the above molecule has at least seven carbon-carbon double bonds, seven carbon-nitrogen double bonds, or seven nitrogen-nitrogen double bonds which are cyclic, or partially cyclic and partially linear. For instance, a structure is provided which is formed by directly bonding plural aromatic hydrocarbons, such as a benzene ring, naphthalene ring, and the like, or plural heterocyclic rings, such as a pyridine ring, pyrimidine ring, thiophene ring, and the like; or a structure is provided, which is formed by bonding the above rings with conjugated chains of carbon-carbon double bonds, carbon-nitrogen double bonds, or nitrogen-nitrogen double bonds; or a chalcone, triphenylene, phthalocyanine, porphyrin structure, and others.

However, the compounds having a large number of double bonds in the molecule have a wide absorption wavelength range, and sometimes the range is extended to the visible light region, where the wavelength dispersion of $\Delta n$ tends to be broad. Accordingly, in order to obtain a high contrast in the liquid crystal display, a retardation film having a larger wavelength dispersion of $\Delta n$ than that of polycarbonate, for instance, a retardation film made of polysulfone, polyarylate, and the like is desirably used. In accordance with the present invention, the representative photo-absorbing organic compound for the photo-absorption material comprise 3-hydroxy-3-phenyl-1-phenyl-2-propene-1-one derivatives. In accordance with the photo-absorption material having at least one of alkyl substituent, alkenyl substituent, or alkoxyl substituent, each of which has 1–8 carbon atoms, the conventional problem of solubility of the photo-absorption material into the liquid crystal mixture could be solved. That is, the photo-absorption material is preferably soluble into the liquid crystal mixture, without regard to the problem of deposition and the like at a low temperature, and is superior in stability at a low temperature.

Furthermore, in accordance with the present invention, the photo-absorption material itself has a mesogenic phase. The solubility of the photo-absorption material into the liquid crystal becomes preferable thereby, and the mesogenic phase of the liquid crystal mixture becomes more stable. In accordance with the present invention, the representative photo-absorbing organic compound of the photo-absorption material comprises benzaldehydeazine derivatives.

In accordance with the liquid crystal display device of the present invention, a photo-reactive liquid crystal compound, which converts its molecular structure by photo-irradiation, and a photo-absorption material are included in the liquid crystal layer. The concentration ratio by weight of the photo-reactive liquid crystal compound and the photo-absorption material is equal to or less than 20. The change rate of birefringence $\Delta n$ of the liquid crystal layer before and after photo-irradiation, including a specified wavelength, is as follows:

0.98>$\Delta n$ (after irradiation)/$\Delta n$ (before irradiation)>0.9

The non-uniformity of display can be decreased significantly by making the concentration ratio in weight equal to or less than 8, and the change rate of birefringence $\Delta n$ before and after photo-irradiation as follows:

0.98>$\Delta n$ (after irradiation)/$\Delta n$ (before irradiation)>0.94

The photo-irradiation source in accordance with the present invention has a specified wavelength for curing the photo-curable resin used for the liquid crystal display element. The photo-curable resin is, for example, a sealing resin for joining a pair of substrates, a sealing resin for sealing the inlet through which the liquid crystal is injected, and others. The wavelength at peak brightness of the photo-irradiation source used for curing the photo-curable resin is, for example, 254 nm, 313 nm, and 366 nm, which are the wavelengths having a strong luminous intensity, when the light source is a mercury vapor lamp. In a case when a xenon lamp is used, a strong luminous intensity is obtained at around the wavelength of 500 nm, and in a case of a gallium lamp, a metal halide lamp, the luminous intensity is strong around 290 nm, 300 nm, 366 nm, 405 nm, 425 nm, and particularly in the range of 400–450 nm.

Furthermore, because the distribution of the luminous wavelength from the photo-irradiation source is continuous, the photo-absorptivity of the photo-absorption organic material is desirably larger than that of the photo-reactive liquid crystal material in as wide a range as possible of the wavelength.

In accordance with the present invention, a photo-reaction of the photo-reactive liquid crystal compound contained in the liquid crystal layer can be suppressed. And, a decrease of the birefringence $\Delta n$ of the liquid crystal layer based on the photo-reaction can be suppressed. As a result, the non-uniformity of display based on photo-deterioration of the liquid crystal material can be decreased, and the object of the present invention to provide high quality liquid crystal display elements can be achieved.

In accordance with the present invention, the non-uniformity of display can be decreased by using an ultraviolet cut filter, of which the wavelength at the transmission factor of 50% is in the vicinity of 350 nm, in the manufacturing step for sealing the liquid crystal inlet.

DESCRIPTION OF THE PREFERRED EMBODIMENTS

Figure 1:
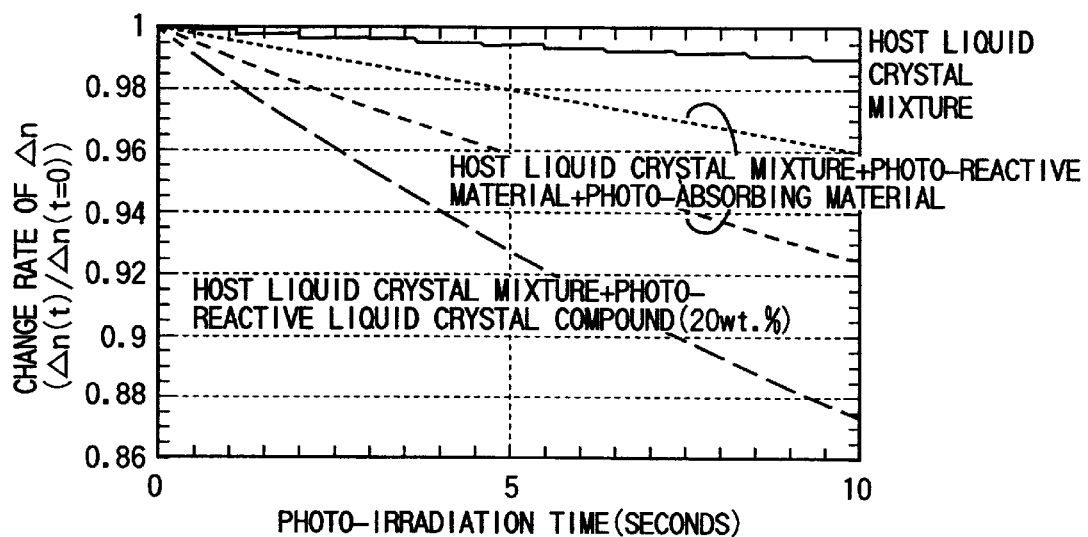
FIG. 1 is a graph indicating a relationship of the change rate of the birefringence $\Delta n$ with the photo-irradiation time of a liquid crystal mixture in the embodiment 6, which is composed by adding a photo-reactive liquid crystal material and a photo-absorption agent to a host liquid crystal mixture.
Figure 2:
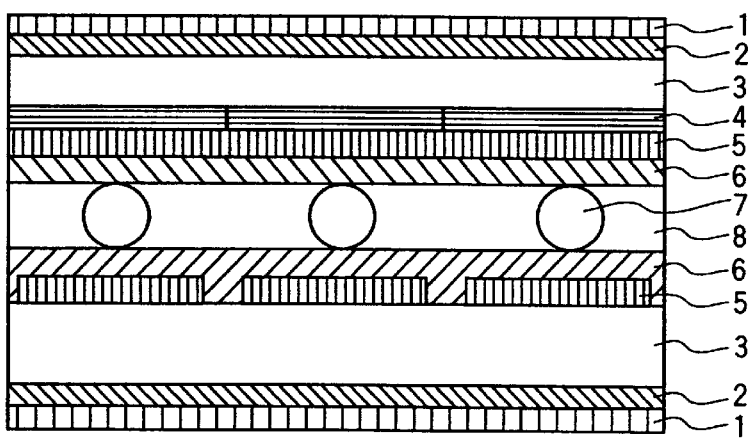
FIG. 2 is a schematic cross section indicating an example of the liquid crystal display elements of the present invention.
Figure 3:
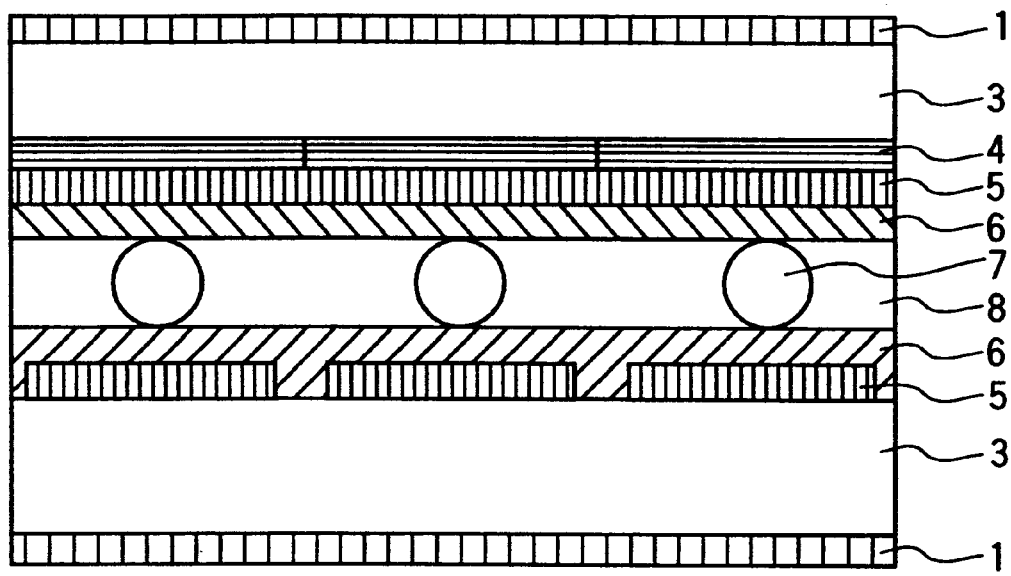
FIG. 3 is a schematic cross section indicating an example of the liquid crystal display elements of the present invention.
Figure 4:
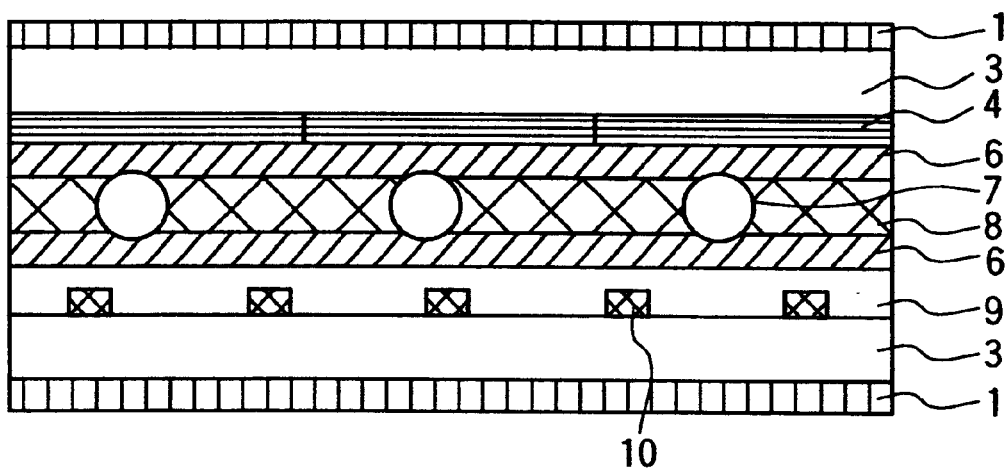
FIG. 4 is a schematic cross section indicating an example of the liquid crystal display elements of the present invention.

Hereinafter, the features of the present invention will be explained in detail with reference to various practical embodiments.

First, the method of photo-irradiation, and the method of measuring the birefringence $\Delta n$ of the liquid crystal material used in the present embodiments will be explained.

The birefringence $\Delta n$ of the liquid crystal material was measured by providing a liquid crystal material in a glass cell, which had been treated previously with a parallel rubbing treatment, and measuring the birefringence $\Delta n$ with varying wavelength under a condition in which the temperature and the cell gap were fixed (W. H. de Jeu: translated by Ichikara Ishii and Syunsuke Kobayashi: "Ekisyou no bussei" (Physical properties of liquid crystal) page 42, Kyoritsu Publishing Co.(1991)).

After measuring the birefringence $\Delta n$ before photo-irradiation, the specimen was irradiated with rays from a high-pressure mercury lamp, and the birefringence $\Delta n$ was determined again. The distance between the light source and the cell was 1 cm, and the irradiation time was 5 seconds or 10 seconds. The dose of light was measured by an apparatus having a measuring range of wavelength from 310 nm to 400 nm, and 350 nm at the center. The quantity of light at that time was 65 mW/cm$^2$. Generally, the dose of light obtained by irradiation with a standard high-pressure mercury lamp under the same condition is at least 50 mW/cm$^2$. The photo-irradiation was performed mainly on the specimens, which were composed by adding the photo-reactive material, and/or the photo-absorption material to the liquid crystal mixture (hereinafter, called a host liquid crystal mixture) mainly composed of cyanophenylcyclohexane and tolane liquid crystal.

Embodiment 1

First, the change of $\Delta n$ of the host liquid crystal mixture itself by photo-irradiation was measured. The host liquid crystal mixture was contained in an orienting cell, and its $\Delta n$ before photo-irradiation, after 5 seconds irradiation, and after 10 seconds, were measured, respectively. As the result, it was found that (Δn after 10 seconds photo-irradiation)/(Δn before photo-irradiation) was in the range of 0.99–0.98. Accordingly, the host liquid crystal mixture itself could be deemed as superior in photo-stability.

Then, trans-α, β-difluoro-β-(p-propylphenyl)-4-propylstyrene was added to the host liquid crystal mixture by 20% by weight, and the birefringence Δn before photo-irradiation, after 5 seconds irradiation, and after 10 seconds were measured, similarly. As a result, it was found that (Δn after 10 seconds photo-irradiation)/(Δn before photo-irradiation) was equal to or less than 0.88.

Figure 5:
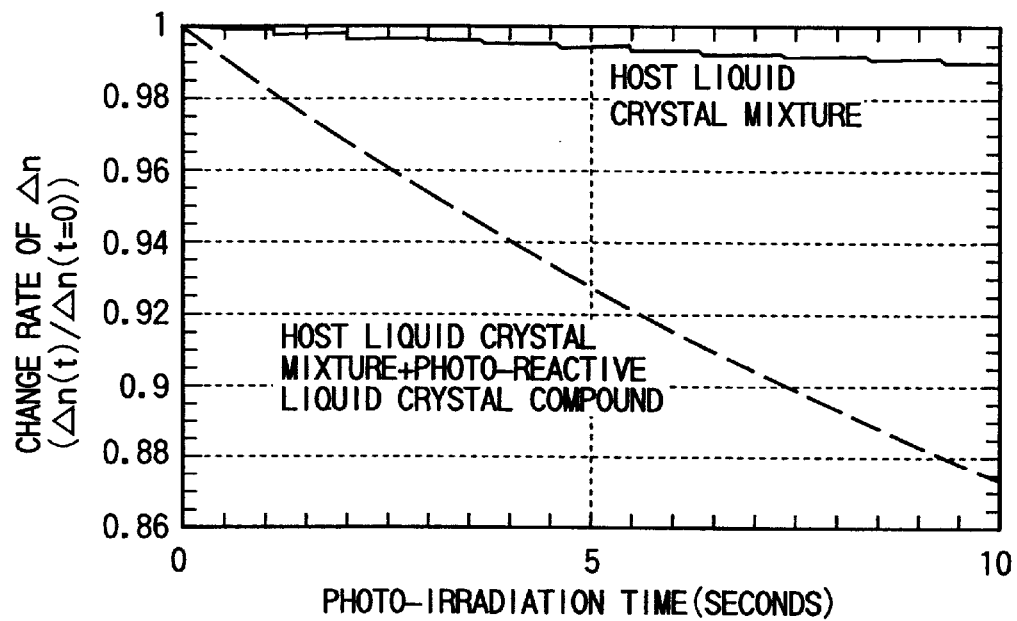
FIG. 5 is a graph indicating a relationship of the change rate of the birefringence $\Delta n$ with photo-irradiation time of the host liquid crystal mixture, and of a liquid crystal mixture in the embodiment 1, which is composed by adding a photo-reactive liquid crystal material to the host liquid crystal mixture.

After measurement of the birefringence Δn, the cell after photo-irradiation was disassembled, and the liquid crystal material in the cell was analyzed. As a result, cis-α, β-difluoro-β-(p-propylphenyl)-4-fluorostyrene was found in the material. That is, it can be assumed that an isomerization reaction from trans-isomer to cis-isomer occurred in the material and that the birefringence Δn was decreased. The change rate of Δn with photo-irradiation time of the host liquid crystal mixture, and of a liquid crystal mixture, which was composed by adding trans-α, β-difluoro-β-(p-propylphenyl)-4-propylstyrene to the host liquid crystal mixture by 20% by weight, is indicated in FIG. 5.

Embodiment 2

Influence of adding trans-α, β-difluoro-β-(p-propylphenyl)-4-propylstyrene to the host liquid crystal mixture on a decrease in the response time of the liquid crystal was studied.

The response time of the liquid crystal mixtures, each of which was prepared by adding trans-α, β-difluoro-β-(p-propylphenyl)-4-propylstyrene to the host liquid crystal mixture by 10% by weight, 20% by weight and 25% by weight, respectively, was determined. The liquid crystal display element used for the measurement was an element of STN (Super Twisted Nematic) mode. The response time was expressed as a sum of the time required for changing the transmission factor of the liquid crystal element from 0% to 90% when a voltage was applied to the liquid crystal element, and the time required for changing the transmission factor of the liquid crystal element from 100% to 10% when the applied voltage was cut off, and the applied voltage was expressed by the voltage when the above two response times became equal.

Figure 6:
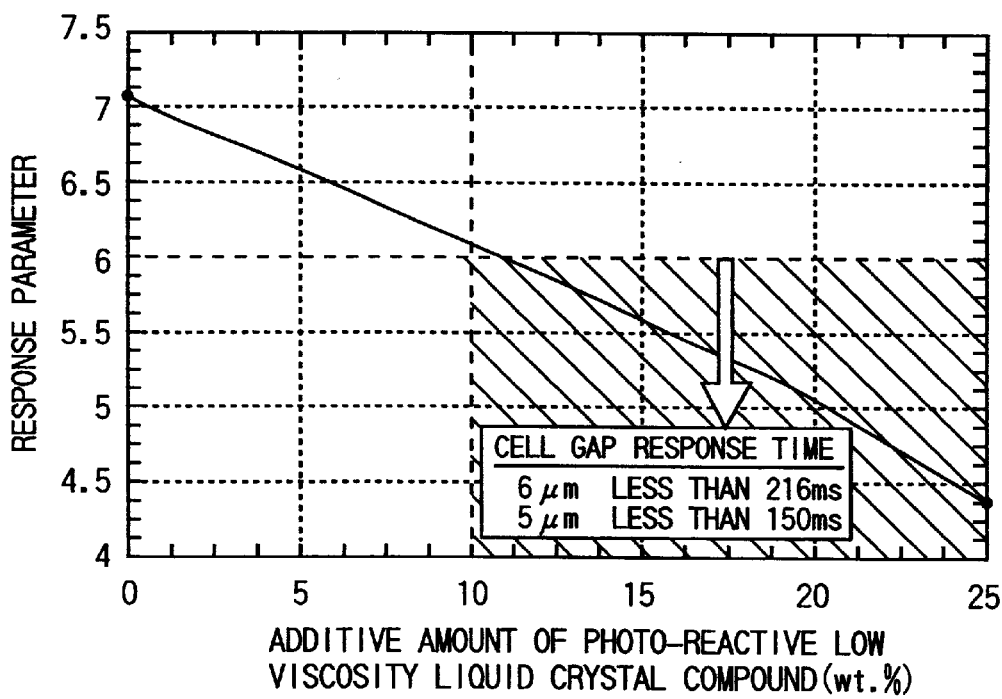
FIG. 6 is a graph indicating a relationship of the response parameter with an additive amount of the liquid crystal compound, which is photo-reactive but of low viscosity, in the embodiment 2.

The experimental results are indicated in FIG. 6.

Because the response time of the liquid crystal is proportional to a square of the standard gap, i.e. the so-called cell gap, of the liquid crystal element, the ordinate in FIG. 6 indicates a response parameter, which is obtained by dividing the response time by the square of the cell gap. That is, in a case when the response parameter is 6 and the cell gap is 6 micron, the response time is 216 ms. If the cell gap is 5 micron, the response time is 150 ms. Generally, the response time necessary for smooth operation of a personal computer with a mouse is considered to be approximately equal to or less than 200 ms, and the response time necessary for display of simplified moving pictures on a personal computer is considered to be approximately equal to or less than 150 ms.

In accordance with FIG. 6, it is revealed that, in order to achieve the response parameter of 6, the additive amount of trans-α, β-difluoro-β-(p-propylphenyl)-4-propylstyrene to the host liquid crystal mixture must be at least 10% by weight.

Embodiment 3

As a photo-absorption agent having carbon chains, 3-hydroxy-1-(p-methoxyphenyl)-3-(p-pentylphenyl)-2-propane-1-one was synthesized. Seven carbon-carbon double bonds are contained in a structure of the above compound. The compound was synthesized in the method of preparing it from chalcone derivatives (JP-A-3-202818 (1991)).

As the photo-absorption agent having carbon chains and a mesogenic phase, 4, 4'-dipentylbenzaldehydeazine was synthesized. Six carbon-carbon double bonds and two carbon-nitrogen double bonds, totally eight double bonds, are contained in the structure of benzaldehydeazine. The compound was synthesized by the method described by W. G. Shaw, G. Brown, et al (Journal of the American Chemical Society Vol. 81, p2532–2537 (1959))and the method of H. E. Zimmerman, S. S. Somasekhara, et al (Journal of the American Chemical Society Vol. 82, p5865–5873 (1960)). In accordance with microscopic observation of its thermal behavior, it was confirmed that 4, 4'-dipentylbenzaldehydeazine had a mesogenic phase. Benzaldehydeazine having no pentyl group was obtained from a commercial product.

Embodiment 4

Photo-absorption of respective solution of trans-α, β-difluoro-β-(p-propylphenyl)-4-propylstyrene, benzaldehydeazine, and 3-hydroxy-1-(p-methoxyphenyl)-3-(p-pentylphenyl)-2-propane-1-one, as described in the embodiments 1 and 3, was measured, and their photo-absorptivities were obtained.

Trans-α, β-difluoro-β-(p-propylphenyl)-4-propylstyrene was dissolved into acetonitrile, and the range of absorption wavelength of the solution was measured by an ultraviolet-visible photo-spectrometer. As a result, it was found that the photo-absorptivity of trans-α, β-difluoro-β-(p-propylphenyl)-4-propylstyrene in an acetonitrile solution was approximately 20000 at a wavelength of 313 nm, and approximately 300 at a wavelength of 366 nm. 3-hydroxy-1-(p-methoxyphenyl)-3-(p-pentylphenyl)-2-propane-1-one was dissolved into acetonitrile, and the range of the absorption wavelength of the solution was measured, similarly. As a result, it was found that 3-hydroxy-1-(p-methoxyphenyl)-3-(p-pentylphenyl)-2-propane-1-one had an absorbance maximum at approximately 360 nm, and its absorptivity around 366 nm was approximately 20000.

Benzaldehydeazine was dissolved into methanol, and the range of its absorption wavelength was measured, similarly. As a result, it was found that Benzaldehydeazine had an absorbance maximum at approximately 300 nm, and its absorptivity around 313 nm was approximately 30000.

Embodiment 5

Figure 7:
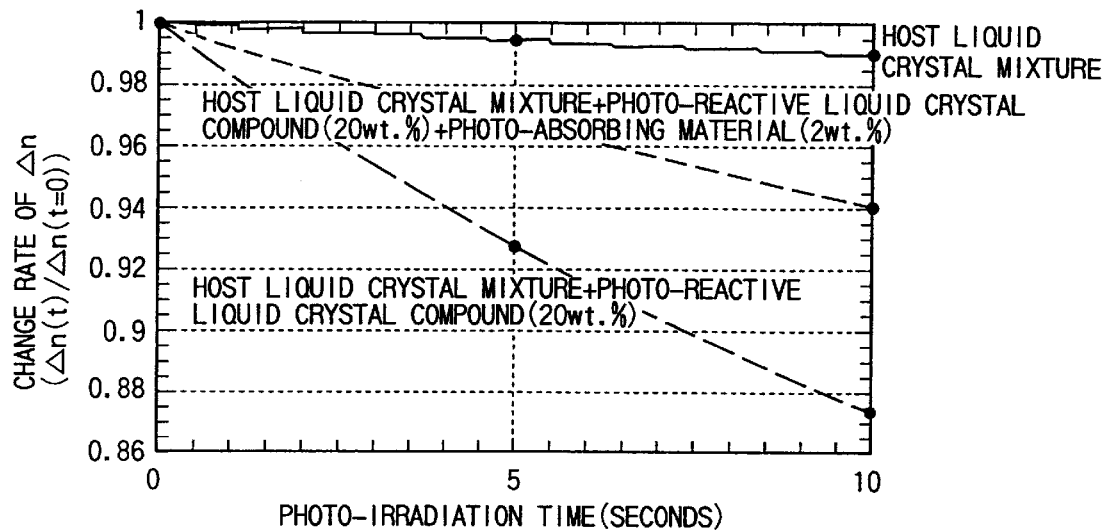
FIG. 7 is a graph indicating a relationship of the change rate of the $\Delta n$ with photo-irradiation time of the liquid crystal mixture in the embodiment 5, which is composed by adding a photo-reactive liquid crystal material and a photo-absorption agent to the host liquid crystal mixture.

After adding trans-α, β-difluoro-β-(p-propylphenyl)-4-propylstyrene by 20% by weight and an appropriate amount of the synthesized 3-hydroxy-1-(p-methoxyphenyl)-3-(p-pentylphenyl)-2-propane-1-one to the host liquid crystal mixture used in the embodiment 1, a change in Δn by photo-irradiation was measured. The result is indicated in FIG. 7. From the experimental result, it was found that when adding trans-α, β-difluoro-β-(p-propylphenyl)-4-propylstyrene by 20% by weight to the host liquid crystal mixture used in the experiment, the change in Δn can be decreased to approximately 0.94 by adding 3-hydroxy-1-(p-methoxyphenyl)-3-(p-pentylphenyl)-2-propane-1-one by 2% by weight to the host liquid crystal mixture.

Embodiment 6

Figure 8:
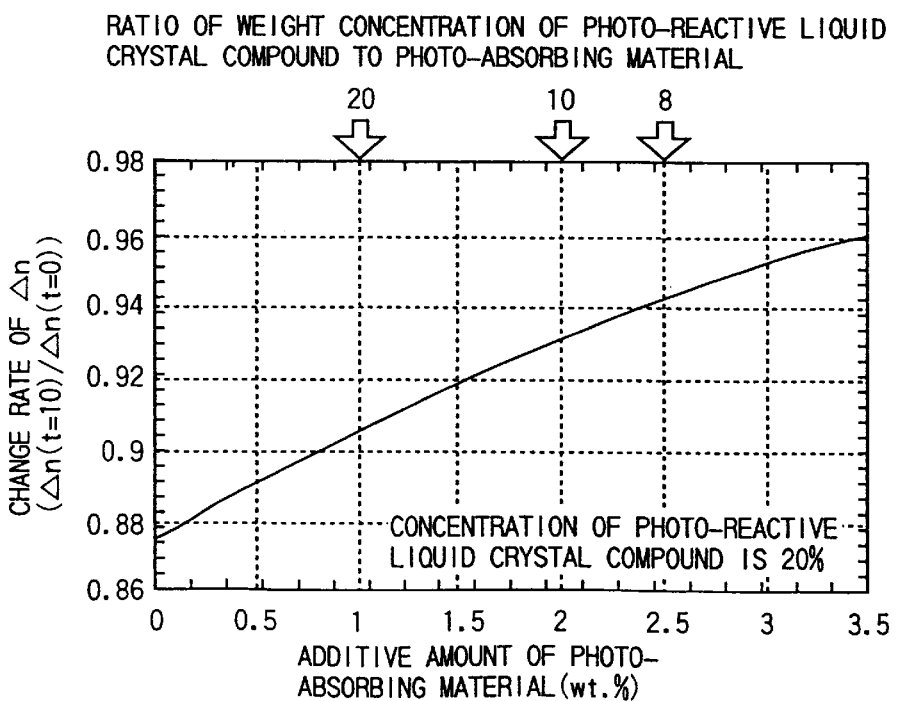
FIG. 8 is a graph indicating a relationship between the additive amount of the photo-absorption agent and the change rate of $\Delta n$ of the liquid crystal mixture in the embodiment 6.

After adding trans-α, β-difluoro-β-(p-propylphenyl)-4-propylstyrene by 20% by weight and an appropriate amount of the 4, 4'-dipentylbenzaldehydeazine synthesized in the embodiment 3 to the host liquid crystal mixture used in the embodiment 1, the change in Δn by photo-irradiation was measured. The result is indicated in FIG. 1. Furthermore, a relationship between the change rate of Δn after photo-irradiation for 10 seconds and the added amount of 4,4'-dipentylbenzaldehydeazine was plotted (FIG. 8). From the experimental result, it was found that when adding trans-α, β-difluoro-β-(p-propylphenyl)-4-propylstyrene by 20% by weight to the host liquid crystal mixture used in the experiment, the change rate of Δn before and after photo-irradiation can be decreased to approximately 0.9 by adding 4, 4'-dipentylbenzaldehydeazine by approximately 1% by weight to the host liquid crystal mixture, and if 4, 4'-dipentylbenzaldehydeazine is added by approximately 2.5% by weight, the change rate of Δn can be decreased to approximately 0.94.

Embodiment 7

Figure 9:
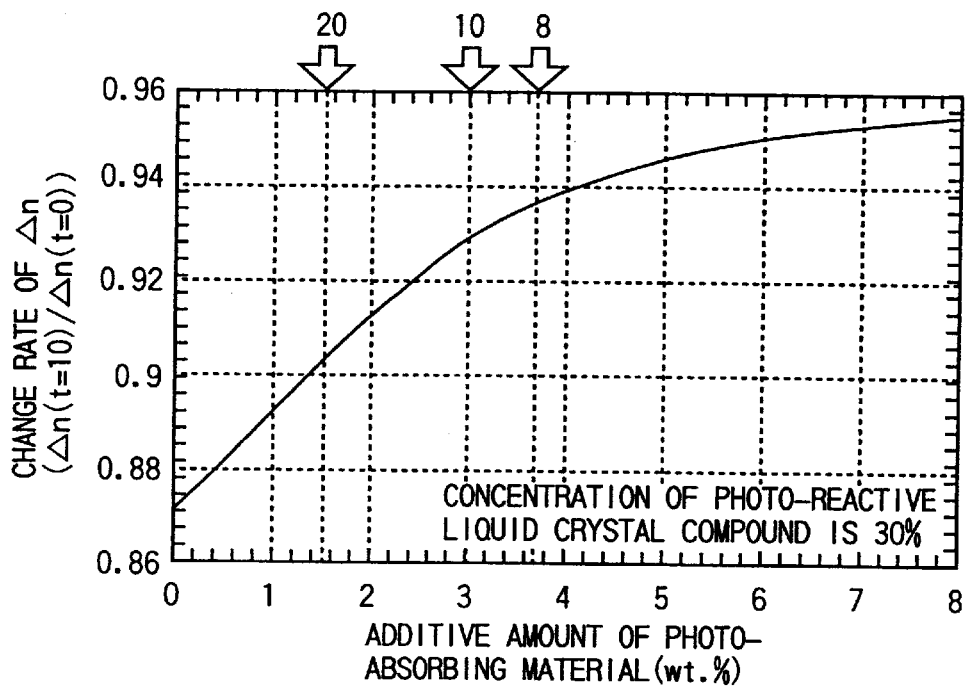
FIG. 9 is a graph indicating a relationship between the additive amount of the photo-absorption agent and the change rate of $\Delta n$ of the liquid crystal mixture in the embodiment 7.

After adding trans-α, β-difluoro-β-(p-propylphenyl)-4-propylstyrene by 30% by weight and an appropriate amount of the 4, 4'-dipentylbenzaldehydeazine synthesized in the embodiment 3 to the host liquid crystal mixture used in the embodiment 1, the change in Δn by photo-irradiation was measured. Furthermore, a relationship between the change rate of Δn after photo-irradiation for 10 seconds and the added amount of 4, 4'-dipentylbenzaldehydeazine was plotted (FIG. 9). From the experimental result, it was found that when adding trans-α, β-difluoro-β-(p-propylphenyl)-4-propylstyrene by 30% by weight to the host liquid crystal mixture used in the experiment, the change rate of Δn before and after photo-irradiation can be decreased to approximately 0.9 by adding 4, 4'-dipentylbenzaldehydeazine by approximately 1.5% by weight to the host liquid crystal mixture, and if 4, 4'-dipentylbenzaldehydeazine is added by approximately 4% by weight, the change rate of Δn can be decreased to approximately 0.94.

From the experimental data of the embodiments 6 and 7, it was found that if the weight concentration ratio of trans-α, β-difluoro-β-(p-propylphenyl)-4-propylstyrene and 4, 4'-dipentylbenzaldehydeazine is equal to or less than 20, the change rate of Δn by photo-irradiation can be decreased to be equal to or more than 0.9, if the weight concentration ratio is equal to or less than 10, the change rate of Δn by photo-irradiation can be decreased to be equal to or more than 0.92, and if the weight concentration ratio is equal to or less than 8, the change rate of Δn by photo-irradiation can be decreased to be equal to or more than 0.94. The change rate of Δn by photo-irradiation varies somewhat depending on the kind and combination with mother liquid crystal of the using photo-reactive liquid crystal compounds. In consideration of variation of the photo-reactivity and the change rate of Δn depending on the different of the material, the weight concentration ratio is more desirably equal to or less than 10, in order to achieve the condition, wherein the change rate of Δn before and after photo-irradiation >0.9.

Embodiment 8

A liquid crystal display element, STN-LCD (Liquid Crystal Display), was manufactured using the prepared liquid crystal mixture. First, a polyimide orientation film was formed on substrates by the steps of applying a polyimide precursor varnish onto a glass substrate having ITO (Indium Tin Oxide) electrodes patterned with a stripe shape, and another glass substrate having color filters and ITO electrodes patterned with a stripe shape, followed by baking. The orientation film was processed with a rubbing treatment, and the substrates were joined together with a thermosetting sealing resin with spacer beads for maintaining a gap so as to cause the ITO electrodes of the upper and the lower substrates to cross perpendicularly relative to each other, to form a rubbing angle with the upper and the lower substrates of 60 degrees (the twisted angle of the liquid crystal is 240 degrees), and to form a uniform interval between the substrates.

The liquid crystal material was injected into an interval between the adhered substrates by a vacuum injecting method through an inlet formed at the sealing portion. After injecting the liquid crystal, the inlet was sealed with a UV curable resin. A high-pressure mercury lamp was used as a photo-curing source for the UV curable resin. The injected liquid crystal material was the host liquid crystal mixture used in the embodiment 1, a liquid crystal mixture composed of the host liquid crystal mixture added with trans-α, β-difluoro-β-(p-propylphenyl)-4-propylstyrene by 10% by weight and trans-α, β-difluoro-β-(p-pentylphenyl)-4-fluorostyrene by 10% by weight, and a liquid crystal mixture composed of the host liquid crystal mixture added with trans-α, β-difluoro-β-(p-propylphenyl)-4-fluorostyrene by 10% by weight, trans-α, β-difluoro-β-(p-pentylphenyl)-4-fluorostyrene by 10% by weight, and 4, 4'-dipentylbenzaldehydeazine by 5% by weight.

After providing a retardation film and a polarizer, the liquid crystal display element was operated by means of a driving circuit. As a result, a non-uniformity of display around the inlet was observed on the liquid crystal display element, wherein only the liquid crystal base material was injected, nor on the liquid crystal display element, wherein the liquid crystal mixture composed of the host liquid crystal mixture added with trans-α, β-difluoro-β-(p-propylphenyl)-4-fluorostyrene by 10% by weight, trans-α, β-difluoro-β-(p-pentylphenyl)-4-fluorostyrene by 10% by weight, and 4, 4'-dipentylbenzaldehydeazine by 5% by weight was injected. However, a non-uniformity of display around the inlet was observed on the liquid crystal display element, wherein the liquid crystal mixture composed of the host liquid crystal mixture added with only trans-α, β-difluoro-β-(p-propylphenyl)-4-fluorostyrene by 10% by weight and trans-α, β-difluoro-β-(p-pentylphenyl)-4-fluorostyrene by 10% by weight was injected.

Figure 10:
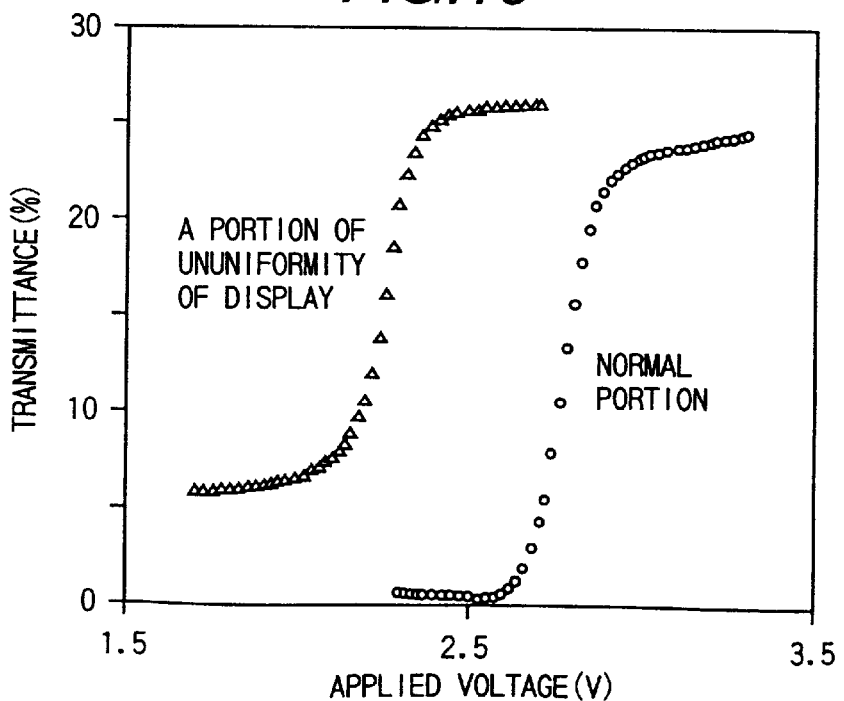
FIG. 10 is a graph indicating relationships between supplied voltage and transmission factor of a portion having a non-uniformity of display, and of a normal portion in the liquid crystal display element of the embodiment 8, wherein the non-uniformity of display was generated.

Voltage-transmission factor curves of the portion wherein the non-uniformity of display was observed and the portion wherein no non-uniformity was observed are indicated in FIG. 10. In accordance with this experimental result, it was found that the photo-reaction of the photo-reactive liquid crystal material could be suppressed by adding a photo-absorption agent to the liquid crystal mixture, and a high grade liquid crystal display element (STN-LCD) having no non-uniformity of display could be obtained.

Embodiment 9

The liquid crystal mixture composed of the host liquid crystal mixture added with trans-α, β-difluoro-β-(p-propylphenyl)-4-fluorostyrene by 10% by weight, trans-α, β-difluoro-β-(p-pentylphenyl)-4-fluorostyrene by 10% by weight, and 4, 4'-dipentylbenzaldehydeazine by 5% by weight used in the embodiment 8 was stored for one month at −30° C. As a result, the liquid crystal mixture maintained the nematic phase at −30° C. even after one month, and no precipitation of crystal was observed. That is, it was found that these mixtures were superior in mutually soluble properties, because 4, 4'-dipentylbenzaldehydeazine itself has a mesogenic phase.

Embodiment 10

A TN (Twisted Nematic) type TFT (Thin Film Transistor)—LCD (Liquid Crystal Display) was manufactured using the prepared liquid crystal mixture. First, a polyimide alignment film was formed on substrates by the steps of applying a polyimide precursor varnish onto a glass substrate having ITO (Indium Tin Oxide) electrodes and TFT elements, which are active elements, and another glass substrate having color filters and ITO electrodes, followed by baking. The alignment film was treated with a rubbing treatment, and the substrates were adhered together with a thermosetting sealing resin with spacer beads for maintaining an interval therebetween, and a rubbing angle was formed with the upper and the lower substrates of 90 degrees (the twisted angle of the liquid crystal is 90 degrees), thereby to form a uniform interval between the substrates.

The liquid crystal material was injected into the interval between the adhered substrates by a vacuum injecting method through an inlet formed at the sealing portion, similar to the embodiment 7. The injected liquid crystal material was a liquid crystal mixture composed of the fluorinated host liquid crystal mixture added with trans-$\alpha$, $\beta$-difluoro-$\beta$-(p-propylcyclohexyl)-4-chlorostyrene by 10% by weight, and a liquid crystal mixture composed of the fluorine group host liquid crystal mixture added with trans-$\alpha$, $\beta$-difluoro-$\beta$-(p-propylcyclohexyl)-4-chlorostyrene by 10% by weight, and 4, 4'-dipentylbenzaldehydeazine by 1% by weight.

After providing a polarizer, a driving circuit was provided, and the liquid crystal display element was operated. As a result, non-uniformity of display around the inlet was observed on the liquid crystal display element, wherein only the host liquid crystal mixture was injected, nor on the liquid crystal display element, wherein the liquid crystal mixture composed of the host liquid crystal mixture added with trans-$\alpha$, $\beta$-difluoro-$\beta$-(p-propylcyclohexyl)-4-chlorostyrene by 10% by weight, and 4, 4'-dipentylbenzaldehydeazine by 1% by weight was injected. However, a non-uniformity of display around the inlet was observed on the liquid crystal display element, wherein the liquid crystal mixture composed of the host liquid crystal mixture added with only trans-$\alpha$, $\beta$-difluoro-$\beta$-(p-propylcyclohexyl)-4-chlorostyrene by 10% by weight was injected.

Figure 11:
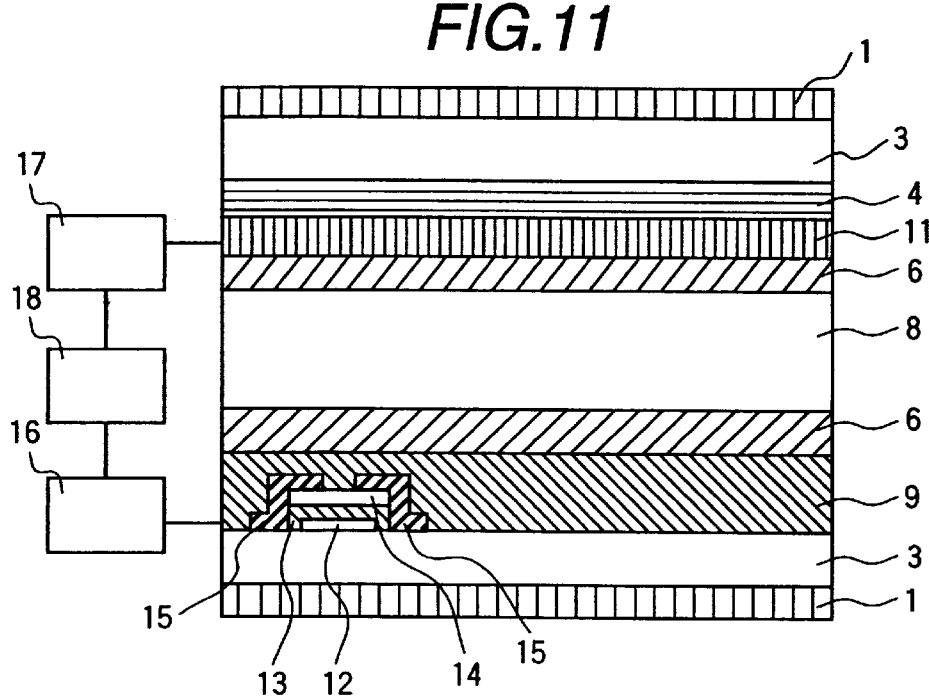
FIG. 11 is a schematic cross section indicating the liquid crystal display device of the embodiment 10.

In accordance with this experimental result, it was found that the photo-reaction of the photo-reactive liquid crystal material could be suppressed by adding a photo-absorption agent to the liquid crystal mixture, and a high grade liquid crystal display element (TN-TFT-LCD) having non-uniformity of display could be obtained. A schematic cross section of the liquid crystal display device of the present embodiment is indicated in FIG. 11.

Embodiment 11

Figure 12A:
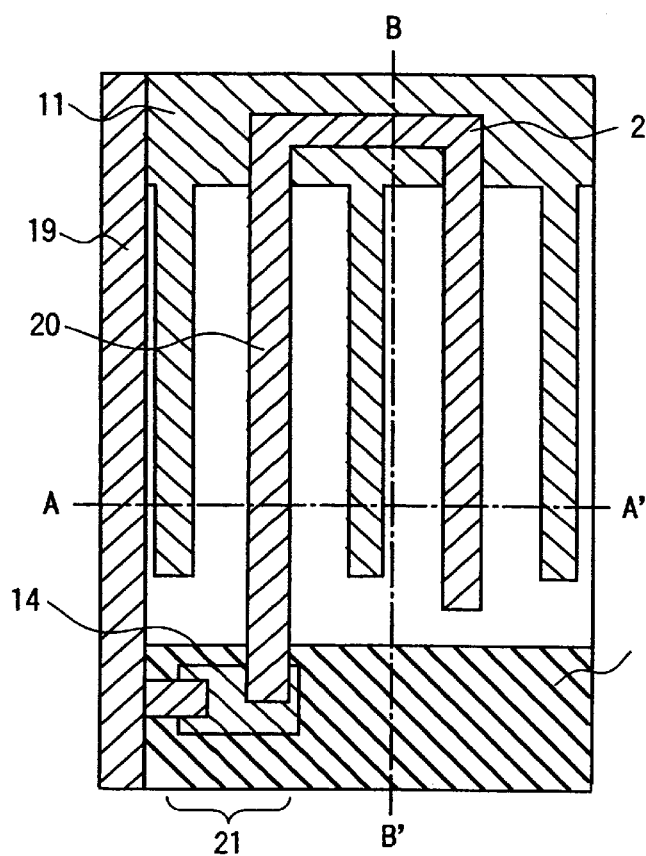
FIG. 12(a) is a schematic plan view and FIGS. 12(b) and 12(c) are cross sectional end and side views, respectively, indicating an arrangement of an electrodes group, insulating film, and alignment layer in an unit pixel of the liquid crystal display element of the embodiment 11.
Figure 12C:
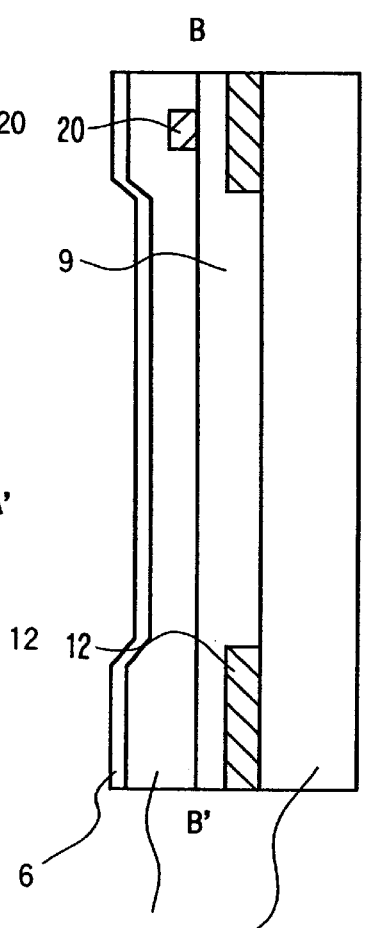
Figure 12B:
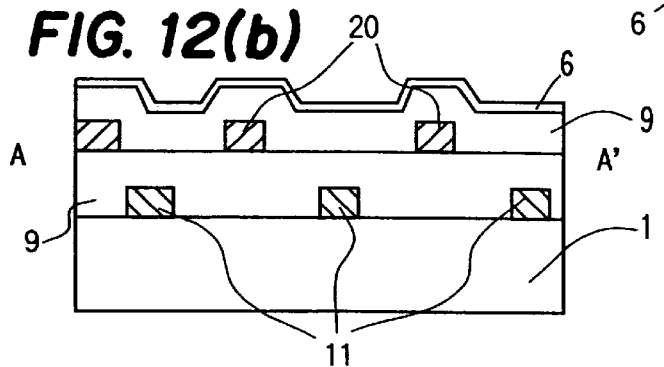
Figure 14:
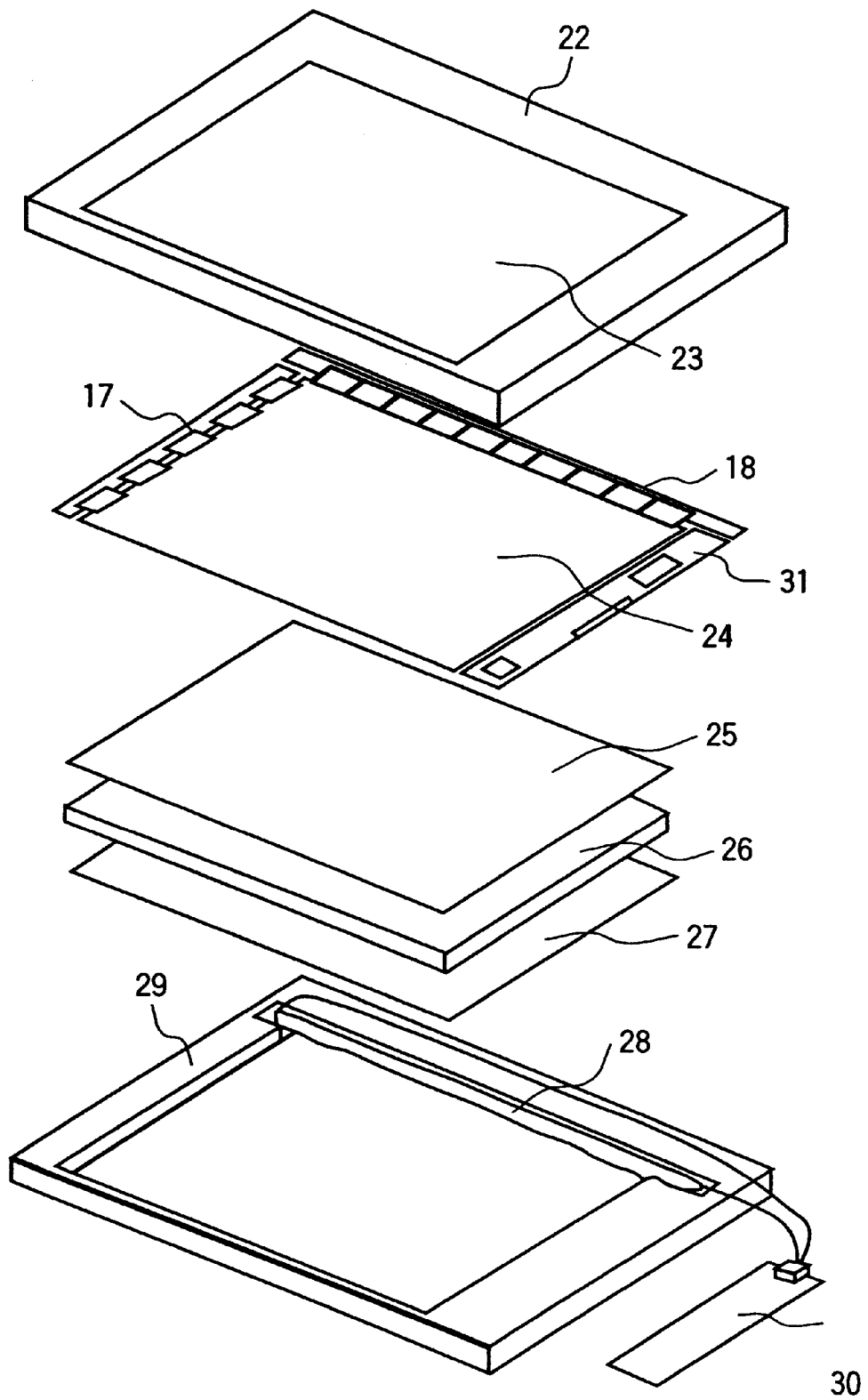
FIG. 14 is an exploded perspective view of the liquid crystal display device disclosed as the embodiment 11.

An IPS (In-Plane Switching) type TFT-LCD was manufactured using the prepared liquid crystal mixture. First, a polyimide alignment film was formed on substrates by the steps of applying a polyimide precursor varnish onto a glass substrate having interdigital electrodes and TFT elements, which are active elements, and another glass substrate having color filters, followed by baking. Schematic cross sections of the interdigital electrodes and the TFT element are indicated in FIG. 12. Then, the orientation film was processed with a rubbing treatment. The rubbing direction of the substrate having the interdigital electrodes and the TFT elements, and the rubbing direction of the substrate having the color filters were approximately in parallel mutually, and the angle formed with the applied electric field was 75 degrees. The substrates were adhered together, liquid crystal was injected, and the inlet was sealed, similar to the embodiment 7.

The injected liquid crystal material was a liquid crystal mixture composed of the fluorinated host liquid crystal mixture added with trans-$\alpha$, $\beta$-difluoro-$\beta$-(p-propylcyclohexyl)-4-chlorostyrene by 10% by weight, and a liquid crystal mixture composed of the fluorine group host liquid crystal mixture added with trans-$\alpha$, $\beta$-difluoro-$\beta$-p-propylcyclohexyl)-4-chlorostyrene by 10% by weight, and 4, 4'-dipentylbenzaldehydeazine by 1% by weight, similar to the embodiment 7.

After providing a polarizer, a driving circuit was provided, and the liquid crystal display element was operated. As a result, non-uniformity of display around the inlet was observed on the liquid crystal display element, wherein only the host liquid crystal mixture was injected, nor the liquid crystal display element, wherein the liquid crystal mixture composed of the host liquid crystal mixture added with transa-$\alpha$, $\beta$-difluoro-$\beta$-(p-propylcyclohexyl)-4-chlorostyrene by 10% by weight, and 4, 4'-dipentylbenzaldehydeazine by 1% by weight was injected. However, a non-uniformity of display around the inlet was observed on the liquid crystal display element, wherein the liquid crystal mixture composed of the host liquid crystal mixture added with only trans-$\alpha$, $\beta$-difluoro-$\beta$-(p-propylcyclohexyl)-4 -chlorostyrene by 10% by weight was injected.

In accordance with this experimental result, it was found that the photo-reaction of the photo-reactive liquid crystal material could be suppressed by adding a photo-absorption agent to the liquid crystal mixture, and a high grade liquid crystal display element (IPS-TFT-LCD) having non-uniformity of display could be obtained.

Comparative example 1

As a method for decreasing the non-uniformity of display around the injection inlet for the liquid crystal mixture, the method disclosed in JP-A-9-160,054 (1997), wherein a UV cut filter was used when curing the UV curable resin for sealing the inlet, was studied. A glass cell was prepared by the same method as the embodiment 8, and a liquid crystal mixture composed of the host liquid crystal mixture added with trans- $\alpha$, $\beta$-difluoro-$\beta$-(p-propylphenyl)-4-propylstyrene by 20% by weight was injected therein. When sealing the inlet after the injection of the liquid crystal mixture, respective color glass filters of UV-33, UV-35, and UV-37 made by Toshiba glass Co. and L-38 and L-39 made by Hoya Co. were used as the ultraviolet cut filter, respectively. As a result, the UV curable resin was not cured when the L-38 and L-39 filters were used, but cured sufficiently when respective ones of the UV-33 and UV-35 filters were used. When the UV-37 filter was used, the UV curable resin was cured, but not sufficiently. After sealing, the non-uniformity of display around the inlet was observed on the liquid crystal display element sealed with the UV-33 and UV-35 filters. This is, because ultraviolet cutting effect of the UV-33 and UV-35 was insufficient, and the photo-reaction was caused in the liquid crystal. When the liquid crystal display element sealed with the UV-37 filter was operated, a non-uniformity of display was observed around the injection inlet of the liquid crystal.

Figure 13:
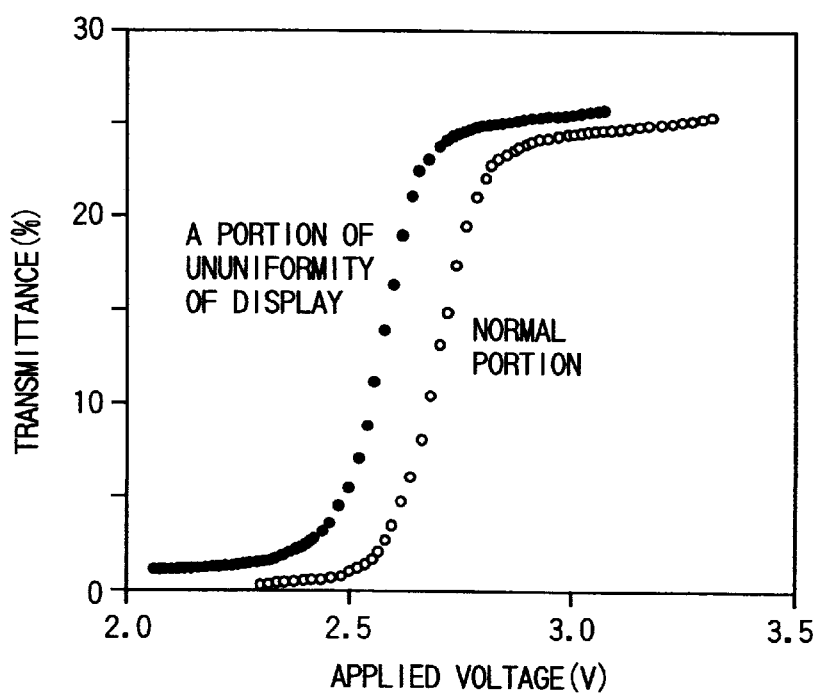
FIG. 13 is a graph indicating relationships between supplied voltage and transmission factor of a portion having a non-uniformity of display, and of a normal portion in the liquid crystal display element of the comparative example 1, the liquid crystal inlet of which was sealed using an ultra-violet cut filter.

The relationships between supplied voltage and transmission factor of a portion having a non-uniformity of display, and of $\Delta n$ normal portion, in the liquid crystal display element is indicated in FIG. 13.

In accordance with the above experimental results, it was found that a non-uniformity of display caused by the photo-reaction of the liquid crystal material could not be prevented by the manufacturing step using only the ultraviolet cut filter. However, if the liquid crystal mixture added with 4, 4'-dipentylbenzaldehydeazine by 5% by weight was used, the non-uniformity of display could be decreased, because the photo-reaction could be suppressed effectively by both the ultraviolet cutting effect of the ultraviolet cut filter and the photo-absorption effect of the photo-absorption agent in the liquid crystal mixture.

Comparative example 2

In accordance with the method disclosed in JP-A-8176, 549 (1996), the photo-reaction suppressing effect by the addition of materials having absorption at regions of wavelength 280–330 nm and 350–420 nm was confirmed. As the material having absorption at regions of wavelength 280–330 nm and 350–420 nm, anthracene was used. The photo-absorptivity of anthracene in a methanol solution is 531 at 296 nm, 1230 at 309 nm, 2750 at 322 nm, 5290 at 338 nm, 7770 at 355 nm, and 7590 at 376 nm. Trans-α, β-difluoro-β-(p-propylphenyl)-4-propylstyrene and anthracene were added into the host liquid crystal mixture by 20% by weight and by 1% by weight, respectively, and the change rate of Δn by the photo-irradiation was measured.

As a result, the change rate of Δn, (Δn at 10 seconds after the photo-irradiation/Δn before the photo-irradiation), was 0.89, and the effect was scarcely observed. From the above observation, it was found that the important property of the photo-absorption agent was not only its absorption wavelength, but also its photo-absorptivity.

In accordance with the present invention, the non-uniformity of display can be decreased, and high grade liquid crystal display devices can be provided.

What is claimed is:

1. A liquid crystal display device comprising:

a pair of substrates, at least one of which is transparent;

a liquid crystal layer held between said pair of substrates; and an alignment layer formed on at least one of said pair of substrates; wherein said pair of substrates are adhered together using a resin so that an interval is formed therebetween, and a portion formed with said resin has at least an opening for injecting liquid crystal into said interval formed between said pair of substrates; and wherein said opening is sealed with a photo-curable resin, and said liquid crystal layer comprises:

(i) a photo-reactive liquid crystal compound, the molecular structure of which is converted by photo-irradiation, and (ii) a photo-absorbing organic compound having a photo-absorptivity larger than the photo-absorptivity of said photo-reactive liquid crystal compound at a designated wavelength, and containing at least one of alkyl substituent, alkenyl substituent, and alkoxyl substituent of 1–8 carbon atoms, respectively, in its molecule.

2. A liquid crystal display device as claimed in claim 1, wherein a molecular structure conversion reaction caused by photo-irradiation in said photo-reactive liquid crystal compound contained in said liquid crystal layer is a trans-cis isomerization reaction.

3. A liquid crystal display device as claimed in claim 2, wherein said photo-reactive liquid crystal compound causing the trans-cis isomerization reaction by photo-irradiation comprises a —CF=CF— structure in its molecular structure.

4. A liquid crystal display device as claimed in claim 1, wherein the concentration of said photo-reactive liquid crystal compound contained in said liquid crystal layer is at least 10% by weight.

5. A liquid crystal display device as claimed in claim 1, wherein a change rate of birefringence Δ n, that is, Δ n (after irradiation)/Δ n (before irradiation) of the liquid crystal layer before and after photo-irradiation including a specified wavelength, is equal to or less than 0.94, in a condition when said liquid crystal layer contains only said photo-absorbing organic compound having a photo-absorptivity smaller than the photo-absorptivity of said photo-reactive compound at the specified wavelength.

6. A liquid crystal display device as claimed in claim 1, wherein the concentration of said photo-absorbing organic compound in said liquid crystal layer is at least 1% by weight.

7. A liquid crystal display device as claimed in claim 1, wherein the weight concentration ratio of said photo-reactive liquid crystal compound to said photo-absorbing organic compound is equal to or less than 10.

8. A liquid crystal display device as claimed in claim 1, wherein said photo-absorbing organic compound comprises at least seven double bond structures of carbon-carbon double bond, carbon-nitrogen double bond, or nitrogen-nitrogen double bond in a molecule.

9. A liquid crystal display device as claimed in claim 1, wherein said photo-absorbing organic compound comprises a mesogenic phase.

10. A liquid crystal display device as claimed in claim 7, wherein said photo-absorbing organic compound is one of 3-hydroxy-3-phenyl-1-phenyl-2-propene-1-one derivatives.

11. A liquid crystal display device as claimed in claim 8, wherein said photo-absorbing organic compound is one of benzaldehydeazine derivatives.

12. A liquid crystal display device comprising:

a pair of substrates, at least one of which is transparent;

a liquid crystal layer held between said pair of substrates; and an alignment layer formed on at least one of said pair of substrates; wherein said pair of substrates are adhered together using a resin so that an interval is formed therebetween, and a portion formed with said resin has at least an opening for injecting liquid crystal into said interval formed between said pair of substrates; and wherein said opening is sealed with a photo-curable resin, and said liquid crystal layer comprises:

(i) a photo-reactive liquid crystal compound, the molecular structure of which is converted by photo-irradiation, and (ii) a photo-absorbing organic compound having a photo-absorptivity larger than the photo-absorptivity of said photo-reactive liquid crystal compound at a designated wavelength, and containing at least one of alkyl substituent, alkenyl substituent, and alkoxyl substituent of 1–8 carbon atoms, respectively, in its molecule; wherein the weight concentration ratio of said photo-reactive liquid crystal compound to said photo-absorbing organic compound is equal to or less than 20, and a change rate of birefringence Δn of the liquid crystal layer before and after photo-irradiation including a specified wavelength is expressed as 0.98>Δn (after irradiation)/Δn (before irradiation)>0.9.

13. A liquid crystal display device comprising:

a pair of substrates, at least one of which is transparent;

a liquid crystal layer held between said pair of substrates; and plural electrodes and an alignment layer provided on at least one of said pair of substrates; wherein said pair of substrates are adhered together using a resin so that an interval is formed therebetween, and a portion formed with said resin has at least an opening for injecting liquid crystal into said interval formed between said pair of substrates; and wherein said opening is sealed with a photo-curable resin, and said liquid crystal layer comprises:

(i) a photo-reactive liquid crystal compound, the molecular structure of which is converted by photo-irradiation, and (ii) an photo-absorbing organic compound having a photo-absorptivity larger than the photo-absorptivity of said photo-reactive liquid crystal compound at a designated wavelength, and containing at least one of alkyl substituent, alkenyl substituent, and alkoxyl substituent of 1–8 carbon atoms, respectively, in its molecule; wherein the weight concentration ratio of said photo-reactive liquid crystal compound to said photo-absorbing organic compound is equal to or less than 8, and a change rate of birefringence Δn of the liquid crystal layer before and after photo-irradiation including a specified wavelength is expressed as 0.98>Δn (after irradiation)/Δn (before irradiation)>0.94.

14. A liquid crystal display device as claimed in any one of claims 1, 12, and 13, wherein said designated wavelength is the wavelength at the peak brightness of the photo-irradiation source for curing the photo-curable resin.

15. A liquid crystal display device as claimed in claim 14, wherein the wavelength at the peak brightness of said photo-irradiation source is any one of 254 nm, 313 nm, and 366 nm.

* * * * *